(12) United States Patent
Schabacker et al.

(10) Patent No.: US 10,908,342 B2
(45) Date of Patent: Feb. 2, 2021

(54) LINEAR LIGHT SOURCE

(71) Applicant: SCHOTT AG, Mainz (DE)

(72) Inventors: Stephan Schabacker, Frankfurt (DE);
Bernd Woelfing, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/216,179

(22) Filed: Dec. 11, 2018

(65) Prior Publication Data

US 2019/0187352 A1    Jun. 20, 2019

(30) Foreign Application Priority Data

Dec. 14, 2017    (DE) .................. 10 2017 129 978
Dec. 14, 2017    (DE) .................. 20 2017 107 616 U

(51) Int. Cl.
*F21V 8/00*    (2006.01)
*G02B 6/02*    (2006.01)

(52) U.S. Cl.
CPC ......... *G02B 6/001* (2013.01); *G02B 6/02338* (2013.01); *F21V 2200/15* (2015.01); *G02B 6/0041* (2013.01); *G02B 6/0055* (2013.01)

(58) Field of Classification Search
CPC .... G02B 6/001; G02B 6/0003; G02B 6/0041; G02B 6/0055; F21S 43/235; F21S 43/236; F21S 43/237; F21S 43/242; F21S 43/245; F21V 2200/15; F21V 2200/40
See application file for complete search history.

(56) References Cited

U.S. PATENT DOCUMENTS

| 6,169,836 B1 * | 1/2001 | Sugiyama | G02B 1/046 362/552 |
| 6,224,237 B1 * | 5/2001 | Wilson | F21V 5/04 362/217.07 |
| 6,234,656 B1 * | 5/2001 | Hosseini | G02B 6/001 362/556 |

(Continued)

FOREIGN PATENT DOCUMENTS

| DE | 4129094 | 3/1993 |
| DE | 102006037797 | 2/2008 |

(Continued)

*Primary Examiner* — Alan B Cariaso
(74) *Attorney, Agent, or Firm* — Ohlandt, Greeley, Ruggiero & Perle, L.L.P.

(57) ABSTRACT

A linear light source is provided that includes a light-emitting element and a light guide, which has a core with an end and a longitudinal extension. In the operating state, light from the light emitting element is injected on the end and is guided along the longitudinal extension. The core includes at least one scattering element that changes a propagation direction of the light guided in the core. The light guide having a lateral surface with a light-blocking coating at least partially or in portions thereof. The light-blocking coating being structured so that the light guide has a light-transmissive portion extending along the longitudinal extension and so that the light scattered on the at least one scattering element and striking the light-transmissive portion is able to escape from the light guide, at least partially. The coating having a light transmittance that is lower than a light transmittance of the light-transmissive portion.

40 Claims, 5 Drawing Sheets

(56) References Cited

U.S. PATENT DOCUMENTS

| | | | | |
|---|---|---|---|---|
| 6,488,397 | B1* | 12/2002 | Masutani | F21V 7/005 |
| | | | | 362/551 |
| 6,584,714 | B1 | 7/2003 | Wehrmann | |
| 6,964,806 | B1* | 11/2005 | Tazaki | B41M 1/30 |
| | | | | 106/31.13 |
| 8,218,938 | B2* | 7/2012 | Ho | G02B 6/001 |
| | | | | 362/551 |
| 8,805,141 | B2* | 8/2014 | Fewkes | G02B 6/001 |
| | | | | 385/100 |
| 2002/0054494 | A1* | 5/2002 | Ishiharada | B60K 37/02 |
| | | | | 362/487 |
| 2007/0239232 | A1 | 10/2007 | Kurtz | |
| 2009/0237954 | A1* | 9/2009 | Goto | G02B 6/0006 |
| | | | | 362/551 |
| 2010/0283376 | A1* | 11/2010 | Kanade | G02B 6/001 |
| | | | | 313/483 |
| 2011/0103757 | A1* | 5/2011 | Alkemper | C03B 37/01211 |
| | | | | 385/124 |
| 2011/0122646 | A1* | 5/2011 | Bickham | G02B 6/0003 |
| | | | | 362/554 |
| 2012/0051092 | A1 | 3/2012 | Kanade | |
| 2013/0088888 | A1 | 4/2013 | Fewkes | |
| 2013/0250610 | A1 | 9/2013 | Brick | |
| 2013/0314940 | A1 | 11/2013 | Russert | |
| 2014/0226353 | A1 | 8/2014 | Sohizad | |
| 2014/0355295 | A1* | 12/2014 | Kuchinisky | G02B 6/001 |
| | | | | 362/558 |
| 2015/0144802 | A1* | 5/2015 | Bauco | C02F 1/325 |
| | | | | 250/435 |
| 2016/0238784 | A1* | 8/2016 | Logunov | G02B 6/001 |
| 2016/0299276 | A1* | 10/2016 | Yamamoto | G02B 1/046 |
| 2017/0045669 | A1 | 2/2017 | Nichol | |
| 2017/0072841 | A1 | 3/2017 | Schabacker | |
| 2019/0072703 | A1* | 3/2019 | Ostlie | G02B 6/001 |

FOREIGN PATENT DOCUMENTS

| | | | |
|---|---|---|---|
| DE | 102008017345 | | 11/2008 |
| DE | 102008009137 | | 8/2009 |
| DE | 102012208810 | | 11/2013 |
| DE | 202014100522 | | 3/2014 |
| DE | 102015007591 | | 12/2016 |
| DE | 102015115265 | | 3/2017 |
| EP | 0788000 | | 8/1997 |
| EP | 0899503 | | 3/1999 |
| JP | 2013161626 | | 8/2013 |
| KR | 20080049975 | | 6/2008 |
| KR | 20140078371 | | 6/2014 |
| WO | WO-2012146960 A1 * | 11/2012 | G02B 6/0005 |

* cited by examiner

LINEAR LIGHT SOURCE

CROSS REFERENCE TO RELATED APPLICATIONS

This application claims benefit under 35 USC § 119 of German Application No. 10 2017 129 978.5 filed Dec. 14, 2017 and of German Application No. 20 2017 107 616.4 filed Dec. 14, 2017, the entire contents of both of which are incorporated herein by reference.

BACKGROUND

1. Field of the Invention

The invention generally relates to light sources that emit their light linearly, that is to say along an elongated area. More particularly, the invention relates to side-emitting elongated glass elements as light sources.

2. Description of Related Art

Elongated light emitters are used in the field of decorative lighting, among others. Linear light emission permits to highlight contours. Also, such emitters are suitable for particular signaling tasks. For example, paths can be marked with light-emitting lines. Escape and rescue route markings in buildings and vehicles shall be mentioned here as an example.

DE 10 2015 115 265, for example, describes a linear light comprising a side-emitting transparent light guide made of glass, which is held in a profile in form-fitting manner by means of a mounting element. The linear light can be installed, by means of the mounting element, in a vehicle part such as a footboard, in door linings, or in a dashboard, inter alia. The light guide emits light to the side, the light exiting through an opening in the mounting element.

Suitable light guides of this type are described in published patent application DE 10 2012 208 810 A2. Such a light guide consists of a glass rod which includes a core of colored glass, in particular a core of white colored glass. The glass rod comprises a cladding material that has a lower refractive index than the glass rod itself so that total internal reflection occurs on the walls of the glass rod thereby allowing for the propagation of light. The core of colored glass within the glass rod is effective as a scattering center and causes emission of light to the side.

SUMMARY

Side-emitting light guides generally do not exhibit directional emission. Also, their appearance in the off state is more or less predetermined, if the light guide is visibly installed. The invention now is based on the object to be able to better control light emission on the one hand, and on the other hand to extend the options for visual design.

Accordingly, the invention provides a linear light source comprising a light guide in which, in the operating state, light from at least one light source and injected on at least one end of the light guide is guided along the longitudinal extension of the light guide by total reflection, wherein the core includes at least one scattering element that changes the propagation direction of the light guided in the core, wherein the light source further comprises at least one light-emitting element for injecting light into one of the ends of the light guide, wherein a light-blocking coating is applied on the lateral surface of the light guide, at least partially or in portions thereof, wherein the light-blocking coating is at least partially structured such that the light guide is light-transmissive in at least a portion of the lateral surface, so that the light scattered on the scattering elements and striking the light-transmissive portion of the lateral surface can escape from the light guide, at least partially. Thus, for light which strikes the light-transmissive portion sidewards and passes through the light guide sidewards and is incident on the coating, the light-blocking coating is less transparent than the portion serving as a light exit window and therefore hides the area behind the rear side of the light guide from the observer. 'Linear light source' refers not only to a rectilinear light source, rather the light guide may extend along any desired shape. Preferably, the coating has a light transmittance for visible light of less than 10%, more preferably less than 5%.

The at least partial coating allows to increase luminance in the emission direction, if the coating is designed to be reflective. Moreover, lower demands are imposed on surface quality and on the material of a device accommodating the light guide, such as a profile, for its integration and/or installation in and/or to a mounting location, since this material will not be visible and does not need to fulfil any optical function, for example does not have to be effective as a reflector.

According to one embodiment of the invention, the light-blocking coating may comprise an ink layer or layer having a color-imparting effect. This layer may be combined with a reflective coating. Such a colored layer may also be opaque already alone, in order to obstruct lateral vision through the light-guiding element. An opaque or semitransparent ink layer can be created by using pigments in the ink layer. According to one embodiment of the invention it is contemplated that the coating comprises a lacquer layer including pigments. Such a layer may also comprise light-reflecting pigments, for example to achieve a metallic or pearlescent effect. Such pigments are known as effect pigments. They may comprise metal flakes or coated platelets that are effective as a dielectric mirror.

It is also conceivable that at least one of the layers furthermore contains phosphorescent and/or fluorescent pigments, or phosphors, and can thus be designed to be self-luminous and/or luminescent, depending on the injected light and/or the ambient light.

In a preferred embodiment, the light-blocking coating comprises a metal coating. Such a coating can be made particularly opaque, so that no or at least hardly any light can escape from the light guide in the coated portion. In this way it is possible to well control light output, for example in order to achieve that the light selectively emerges from the opening of an installation recess or profile in which the light guide is placed, and that rear walls of the recess are preferably not illuminated. Another particularly advantageous feature is that a metallic reflective film allows to imitate metal strips as design elements. In this way, the light guide may get a visual appearance similar to a chrome trim.

An article equipped with a light source according to the invention can thus get a high-quality and uniform or selectively differentiated appearance.

For good light-guiding properties it is advantageous if the light-scattering element or elements are not evenly distributed in the transparent material. In case of an even distribution, a slight turbidity of the transparent material would result.

Rather, a scattering element can be defined by a linear or thread-like light-scattering region that extends along the longitudinal extension of the light guide. This has the further advantage, inter alia, that the scattering structures are visually less conspicuous in this way. Although the linear light-scattering region might even be clearly visible when viewed from the side, it extends in the axial direction and hence in parallel to reflections of external light sources on the lateral surface and is therefore not visually conspicuous. In addition, the linear light-scattering region appears as a light-emitting or luminous element, which is very thin in an advantageous embodiment. This allows to achieve very appealing effects in terms of aesthetic design.

Generally, the light source according to the invention may be designed so that it is not recognizable as a functional element, i.e. as a light, in its switched-off state. The coating may be adapted to the design of a surface of an item or a device in which the light source is integrated, or may be selectively differentiated therefrom, or it may be a creative design element of this surface. A first example is a color matching of the coating on the light guide to the color of the surface adjacent to the light guide. For this purpose, the light-blocking coating may generally also be black in extreme cases. Such a black coating may be substantially fully absorbent, or may else be partially reflective, in spite of the black color, such as a smooth lacquer layer, for example. On the other hand, the light source may selectively differ in color or in terms of visual appearance from the surrounding surface. One example is a light source which has a visual appearance similar to a chrome trim, due to a metallic specularly reflecting coating.

The lateral surface in the light-transmissive portion may advantageously also be coated. Only, the possibility of light emission should be given. So, according to one embodiment of the invention it is contemplated that the opaque coating extends into the light-transmissive portion of the lateral surface, but is patterned and/or graded there such that the coating is at least partially transmissive to the light.

The transition from the light-transmissive portion to the opaque portion having the light-blocking coating may extend along defined boundary lines extending along the longitudinal extension of the light guide in this case. But it is also possible to provide a gradual transition. In this case it is possible, inter alia, to provide a light-blocking coating with a thickness that decreases in the azimuthal direction or along the circumference, so as to gradually merge from an opaque or, more generally, light-blocking coating into the light-transmissive portion. Also, a multi-layered coating may be provided, such as a combination of a metal layer and a lacquer layer, to achieve visual effects. The lacquer layer may be applied prior to the metal layer, for example in order to achieve a specific color appearance. Subsequent coating is also possible, inter alia in order to protect the opaque coating. In any case, the coating may extend into the light-transmissive portion.

Additional coatings that come into consideration include sol-gel layers, inter alia, as well as layers deposited by vacuum deposition processes. In both cases it is possible to very precisely control layer thicknesses, so that the layers may also have specific interference optical properties. For example, it is possible to produce a coating that has a dichroic effect and is effective as an antireflective layer or, conversely, as a reflective layer, or as a dichroic colored layer.

The light-blocking coating may be implemented at least partially or in portions in the longitudinal direction, for example in form of strips (with interruptions). This allows to partially adjust luminance and homogeneity, for example in terms of luminance and color or color temperature, in the longitudinal direction. For long light guides, in particular with lengths of more than one meter, it is possible in this way to improve the homogeneity of light emission in the emission direction. This is especially true for so-called indirect lighting. More generally, it is therefore contemplated according to a further embodiment of the invention that the light-blocking coating comprises a plurality of longitudinal portions that are spaced along the longitudinal extension of the light guide and separated from each other.

In order to achieve directional emission with high efficiency, a linear light-scattering region may be provided, which is arranged eccentrically in the cross section of the light guide. The linear light-scattering region acts like a thin thread-like light source. Its position within the light guide can significantly influence light emission. Accordingly, the at least one scattering element or the light-scattering region may be arranged along the axial direction and eccentrically, i.e. spaced from the axis of the light guide. According to one embodiment of the invention, it may in particular be advantageous if the linear light-scattering region is closer to the light-blocking coating than to the light-transmissive portion as seen in the cross section. In other words, a linear light-scattering region is provided, which extends along the longitudinal extension of the light guide within the transparent material, and the linear light-scattering region is offset from the center of the light guide towards the portion of the lateral surface opposite the light-transmissive portion or part. When considering the light-blocking and light-reflecting coating as a cylindrical or, more generally, as a uniaxial focusing reflector, the position of the linear light-scattering region will be offset from the center towards the focal point as a result of the above-mentioned measure. According to one embodiment, the light components scattered towards the light-reflecting coating by the linear light-scattering region are reflected back towards the light-transmissive portion as a parallel beam in the cross-sectional plane. Generally, the linear light-scattering region may be positioned in the cross section of the light guide such that the emitted light will be collimated by the effect of the curved reflective coating in cooperation with the refraction of the light as it exits the light guide sideways. It will be apparent from this embodiment of the invention that particular advantages are resulting from a combination of a light-scattering fiber and a specularly reflecting coating, since the fiber acts like a small light source and hence like a light source of high etendue. Thus it is possible with a suitable design of a specular or directionally reflective light-blocking coating, to well and efficiently design the emission angle of the light guide depending on the requirements.

The invention will now be described in more detail with reference to the figures.

DETAILED DESCRIPTION

Figure 1:
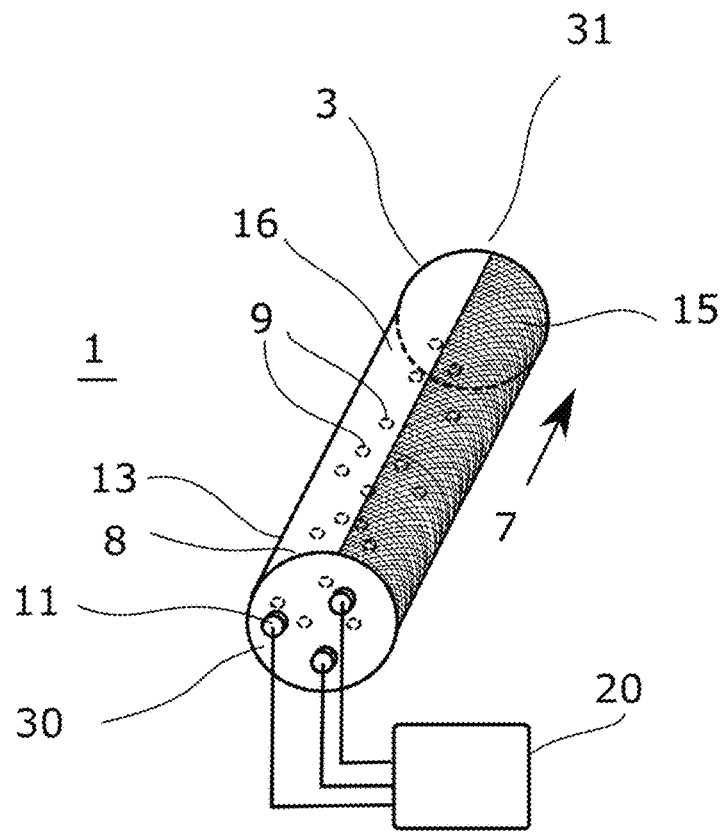
FIG. 1 shows a schematic view of a linear light source.

FIG. 1 schematically illustrates an embodiment of a linear light source according to the invention. Linear light source 1 comprises an elongated light guide 3 made of transparent material 5. Glass is particularly preferred as the transparent material, inter alia due to its long-term stability. Also, glass can be coated very well and durably with reflective and/or specular and/or otherwise light-blocking coatings. However, besides of glass, plastics may be used as well as the transparent material 8. Generally, depending on the material used and the dimensions of the light guide 3, the latter may be flexible or rigid. The light guide may be installed in rectilinear or curved form.

Generally, without being limited to the illustrated example, the light guide 3 is configured as a single conductor comprising a single light-guiding element. The light of one or more light sources 11 injected at one end 30 is guided along the longitudinal extension 7 of the light guide 3. In the illustrated example, light-emitting elements 11 are provided only at one end 30. However, light-emitting elements 11 may also be provided at both ends 30, 31 of the light guide 3.

Figure 2:
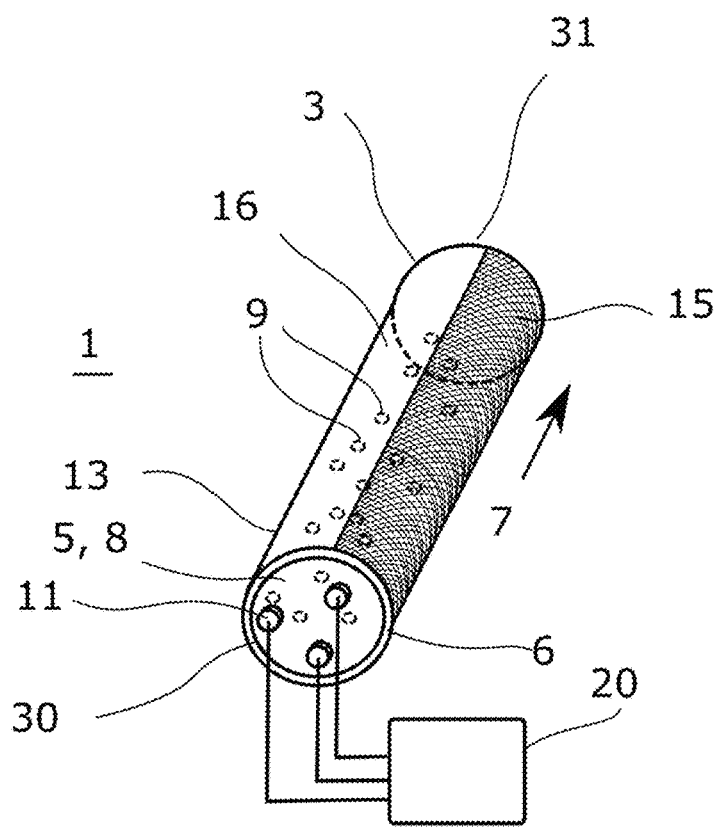
FIG. 2 illustrates a variant comprising a core-cladding light guide.

The light guide 3 according to the variant of FIG. 2 has a core-cladding conductor design. Accordingly, a cladding 6 surrounds the core of transparent material 8. The materials of core and cladding differ in their refractive indices. In this case, without being limited to the example shown in FIG. 1, the core 5 generally has a higher refractive index than the cladding, so that total reflection of the guided light will result at the core-to-cladding interface. In order for the light to be emitted gradually, the transparent material 5 includes at least one scattering element 9. The light scattered on scattering element 9 changes its direction due to the scattering, so that the angle for total reflection may be exceeded and the light will pass through the lateral surface 13 in this case.

The lateral surface 13 of light guide 3 has a light-blocking coating 15 applied thereon, partially or in portions thereof. Coating 15 is preferably designed so as to at least partially reflect or backscatter light rays that pass through the cladding 6.

The coating 15 may also be designed to be specular so as to reflect light rays on the lateral surface 13 like a mirror, which also means to be correspondingly smooth. According to another embodiment, the light-blocking coating is designed to be diffusely reflecting. For this purpose, the light-blocking coating 15 may be a lacquer layer comprising pigments, for example.

Furthermore, the light-blocking coating 15 is structured in a sense that portions of the lateral surface 13 are coated and other portions of the lateral surface are not coated. Specifically, the light guide 3 is light-transmissive in at least one portion 16 of the lateral surface 13, so that the light scattered on scattering elements 9 and striking the light-transmissive portion 16 of the lateral surface 13 is able to escape from the light guide 3. However, another type of structuring is also conceivable. For example, the light-transmissive portion 16 may also be provided with the light-blocking coating 15, but there in a manner so that the coating 15 is at least partially transmissive for the light emitted from light guide 3, for example due to an adapted reduced thickness of the coating 15.

The light-blocking coating 15 is particularly preferably designed as a metal coating or comprises a metal coating and is therefore light-reflective. Also conceivable is the use of a dielectric coating in the form of a mirror-effect interference layer system. However, dielectric layers may also be combined with a metal coating, for example if a particular color appearance is to be achieved in the switched-off state or if the emitted light spectrum is to be changed compared to the original light color of the light sources 11.

Figure 3A:
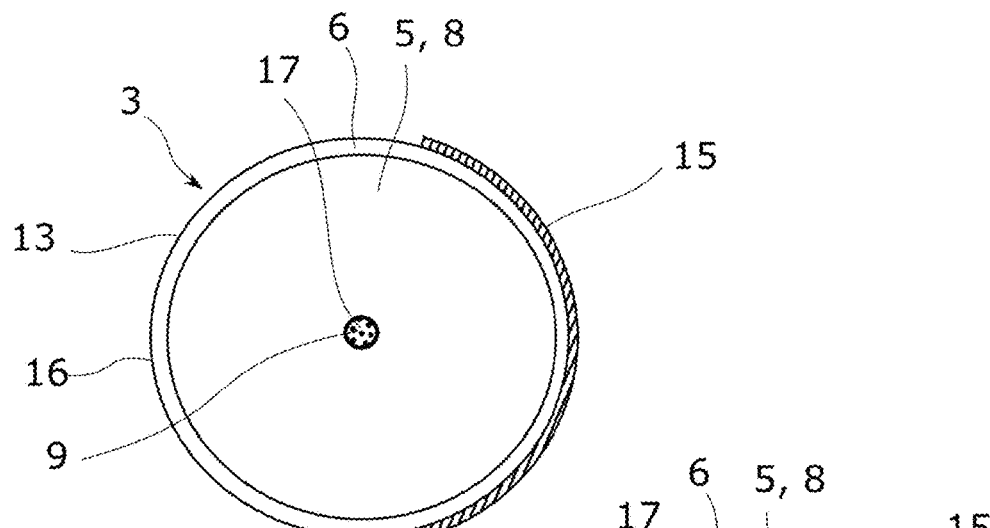
FIGS. 3A, 3B, and 3C are cross-sectional views of exemplary light guides of a light source with different types of light-scattering elements.
Figure 3B:
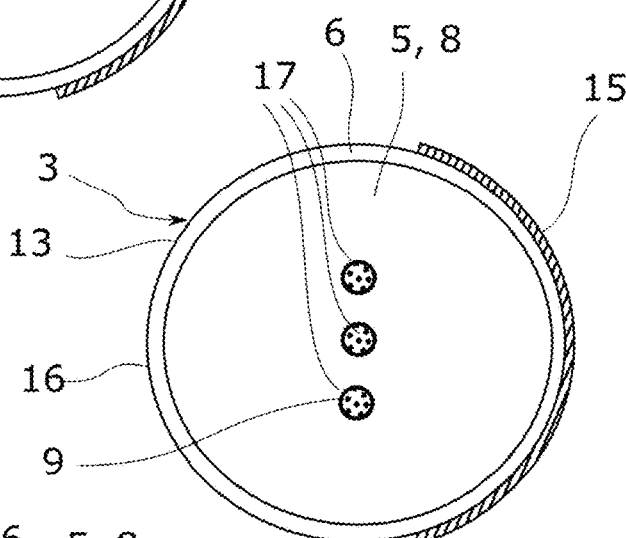
Figure 3C:
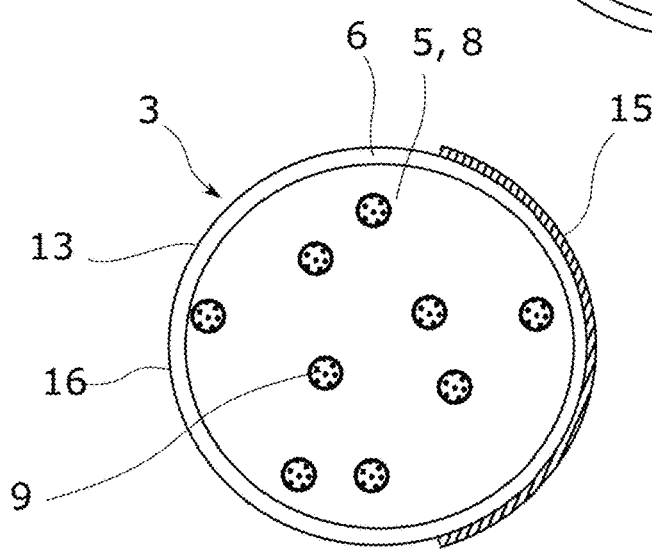

FIGS. 3A, 3B, and 3C show exemplary embodiments of cross sections through light guides 3 of a light source 1 according to the invention. Particularly preferably, the light guide 3 is designed as a single conductor, i.e. it is composed of a single light-guiding element. In the embodiment shown in FIG. 3A, the scattering elements 9 are located along a linear or thread-like or fiber-like light-scattering region 17 that extends along the longitudinal extension of the light guide. Such a light guide 3 may be produced by forming a preform of two or more glass rods. In this case, one or more of the glass rods contain light-scattering particles. The particles may be added to the glass or may else be defined by demixing or phase separation in the glass and/or may be formed from the glass. When drawing such a preform, a light guide 3 is then obtained, while a linear light-scattering region is formed from a glass rod including the light-scattering particles. The fabrication and various configurations of light guides is described in DE 10 2012 208 810 A1, the content of which is incorporated into the subject matter of the present application by reference.

FIG. 3B shows a variant in which a plurality of linear light-scattering regions 17 are arranged within the light guide 3. The arrangement may be regular, as in the illustrated example. A plurality of light-scattering linear regions 17 are located side by side here, and may create the impression of a luminous ribbon, for example.

Even bubbles may serve as scattering elements in the glass. It is even possible to selectively introduce such bubbles by suitable methods, for example at specific positions. Like other types of scattering elements such as particles or bubbles embedded between the glass rods, they may be disposed in the transparent material 8 in a controlled arrangement or in irregularly distributed manner.

In the example shown in FIG. 3C, the light-scattering elements 9 in the transparent material 8 of the light guide 3 are distributed randomly. These light-scattering elements may be bubbles and also particles, for example, more generally these are localized regions with a refractive index differing from the surrounding material. It is generally also possible for the light-scattering elements 9 to be located at the interface between core 5 and cladding 6, as punctiform or linear regions. Furthermore, all embodiments shown in FIGS. 3A, 3B, and 3C have a cladding 6. However, it is also possible to similarly provide a light guide 3 without cladding.

On the lateral or outer surface 13 of the light guide 3, a light-blocking coating 15 is deposited, for example in the form of a metal layer or metallization as mentioned above. The coating 15 may be formed as an ink layer, or may comprise a ink layer. The coating 15 covers a sector of the circumference, so that the coating 15 forms a strip extending in the axial direction on the lateral surface. The remaining sector not covered by the metal layer forms a light-transmissive portion 16 of the lateral surface 13.

The light of light guide 3 guided in the transparent material 5 is guided through total reflection. Occasionally, it will strike the light-scattering linear region 17, where the direction of the light is changed due to scattering on the light-scattering elements 9, so that it no longer fulfills the condition for total reflection, at least in part, and the light can exit through the lateral surface 13. However, in a typical installation situation, only a portion of the lateral surface is usable, namely the one which faces the space to be illuminated. However, the light guide 3 may now be installed such that the light-transmissive portion 16 faces the space to be illuminated. Light that strikes the lateral surface 13 opposite thereto cannot escape there, but is reflected back on the light-blocking, e.g. specularly or diffusely reflecting coating 15, so that after having passed through the light guide 3 it will finally again strike the light-transmissive portion 16 and can exit there.

Figure 4:
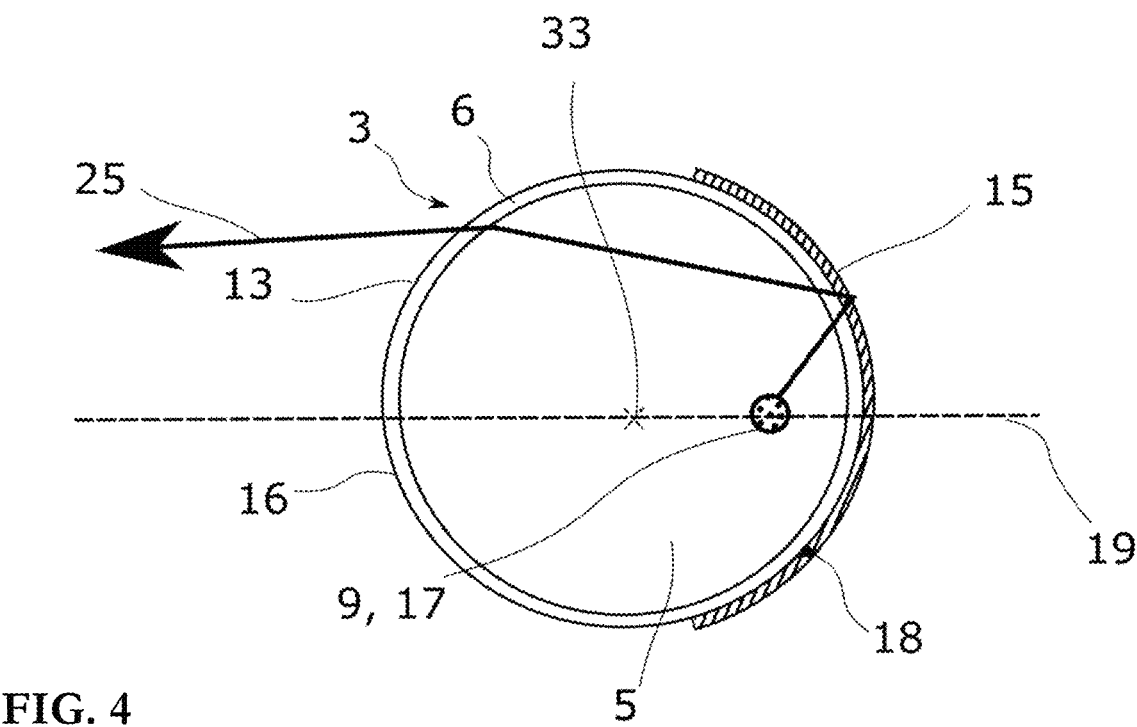
FIG. 4 shows a variant of the exemplary embodiment shown in FIG. 3A.

FIG. 4 is a cross-sectional view through the light guide 3 showing a variant to the embodiment of FIG. 3A. In this variant, the linear light-scattering region 17 is arranged eccentrically. With such an arrangement it is possible to influence the angular distribution of the emitted light. Specifically, it is contemplated according to an embodiment of the invention as illustrated, that the linear light-scattering region 17 extends along the longitudinal extension of the light guide 3 within the transparent material 5 and is offset from the center 33 of the light guide 3 towards the portion 18 of the lateral surface 13 opposite light-transmissive portion 16. Portion 18 is that portion of the lateral surface 13 which is provided with the light-blocking coating 15. A light ray 25 is indicated in order to clarify how the location of the linear light-scattering region 17 influences the angular distribution. This light ray emanates from the linear light-scattering region 17 and initially strikes the portion 18 of the lateral surface, which is provided with the specularly reflecting coating 15. As in the example shown, the linear light-scattering region 17 may be in the focus of the coating 15 that is effective as a cylindrical concave mirror, so that the light is reflected back more or less in parallel to the connecting line between the center 33 and the location of the linear light-scattering region 17 and is directed towards light-transmitting portion 16. Spatial light emission is also influenced by refraction on the lateral surface. Here, too, an offset of the linear light-scattering region will cause light rays to be preferably refracted in the direction opposite to the offset of the light-scattering region. A similar effect can also be achieved by shifting the light-scattering region away from the coating 15. In general, this example shows how a combination of the positional arrangement of light-scattering elements and the light-blocking coating 15 can influence light emission. Without being limited to the illustrated example, it is therefore contemplated that the linear light-scattering region 17 is arranged eccentrically within the light guide 3 in such a way that the light emitted by the light guide 3 is collimated by refraction on the lateral surface 13 or by reflection on the light-blocking coating 15. Here, collimation not only means that a parallel beam is generated, but more generally that a concentration of light distribution is achieved on the plane 19 extending through central axis 33 and linear region 17.

Figure 5:
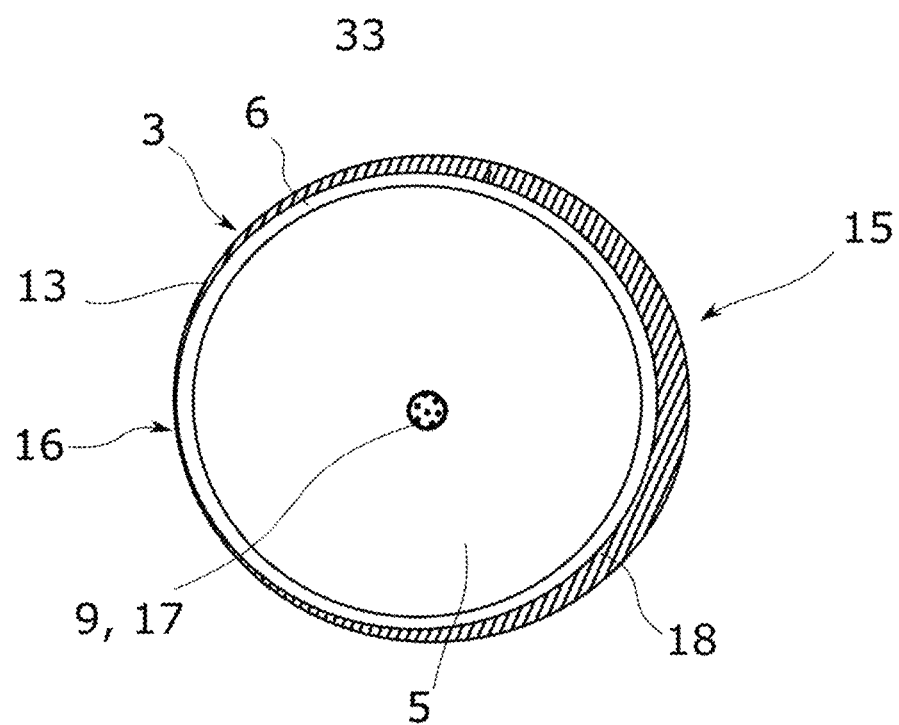
FIG. 5 shows an embodiment in which the single light-blocking coating extends into a light-transmissive portion.

FIG. 5 illustrates a further variant of the invention. This variant is generally based on the fact that the light-blocking coating 15 extends into the light-transmissive portion 16 of the lateral surface 13 and has such a structure in this light-transmissive portion 16 that the light-blocking coating 15 is partially transmissive to the light. The coating 15 may again be in the from of a metallic specularly reflecting layer. Generally, the structure for achieving partial transmittance in portion 16 may be such that the layer thickness of the coating 15 is sufficiently low so that part of the light can pass through the coating 15. As can be seen from FIG. 5, the coating 15 has a thickness here which continuously decreases along the circumference. Accordingly, there need not be a sharp boundary between light-transmissive portion 16 and the region where the coating 15 is opaque.

Such a coating 15 can be produced in a simple manner by being applied to the lateral surface 13 of light guide 3 by a more or less directed deposition source. Sputter-deposition and vapor deposition of a metal layer are examples that can be mentioned here.

Figure 6:
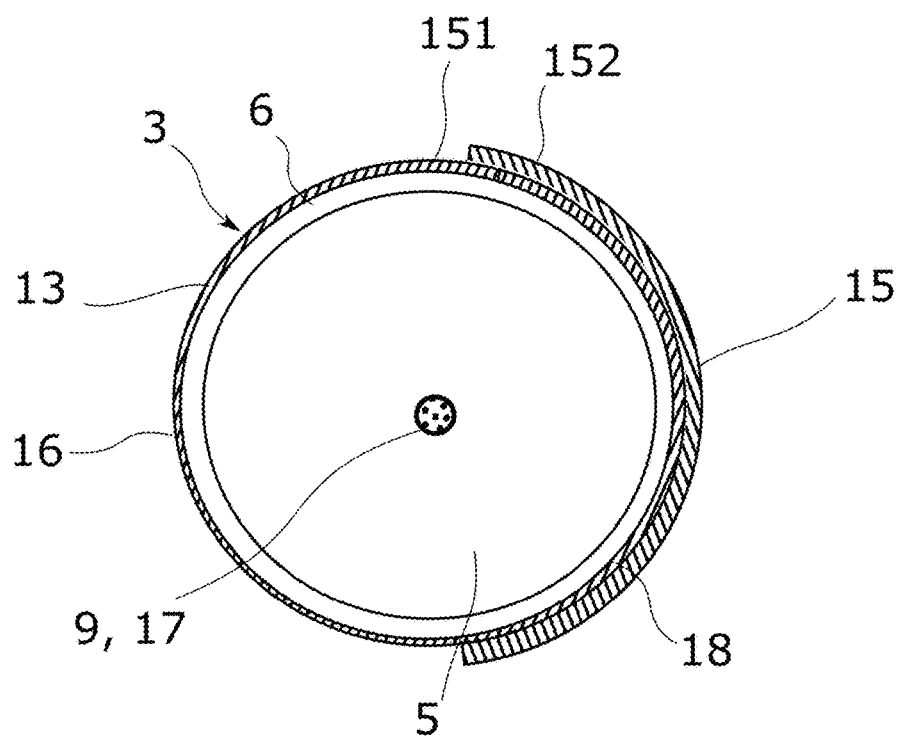
FIG. 6 shows a variant of the embodiment illustrated in FIG. 5, comprising a multi-layered structure.

Unlike illustrated in FIG. 5, however, it is generally also possible to apply a light-blocking coating in two steps such that a light-blocking coating 15 is obtained where both layers are provided, and so that the light-transmissive portion 16 is covered by only one of these two layers. Such a variant is shown in FIG. 6. Generally, as in the example shown in FIG. 6, the opaque coating 15 may have a multi-layered structure. The layers may be identical or different in terms of their material in this case. In the example shown, light-blocking coating 15 comprises two layers. Both layers 151, 152 may be metallic, so that the light-blocking coating 15 as a whole represents a metal coating. In this case, the inner layer 151 is so thin, in the illustrated example, that it is partially transmissive to the light scattered out on the light-scattering structure 9.

In order to be able to use a metal coating as a light-blocking coating 15 for reliably hiding structures that lie behind the light guide in this way, it is generally advantageous if the layer thickness of the metal coating is at least 100 nm. According to one embodiment, the coating 15 is implemented in the form of a chromium layer of at least 100 nanometers thickness, for example.

Furthermore, according to yet another embodiment of the invention, a multi-layered coating 15 may comprise an inner transparent ink layer and a reflective layer applied on the ink layer. The reflective layer may again be a metal coating. Accordingly, in the example shown in FIG. 6, layer 151 would be the inner ink layer, and layer 152 would be a metal coating deposited thereon. With such a combination it is possible, for example, to create a colored specularly reflective appearance. For example, in combination with a yellow colored layer it is possible to obtain the appearance of a gold trim strip in this way. Unlike illustrated in FIG. 6, layers 151, 152 may also terminate at a common boundary and the light-transmitting portion 16 may in particular be non-coated in this case.

Figure 7:
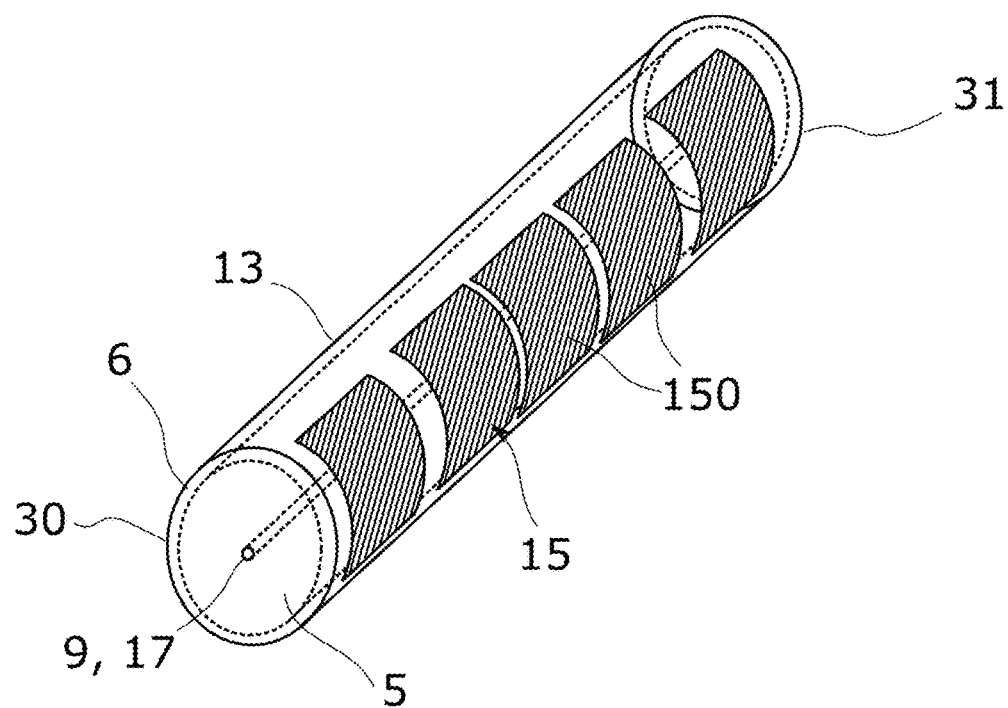
FIG. 7 shows an embodiment with a light-blocking coating that is divided into multiple portions.

FIG. 7 illustrates a further embodiment of the invention. In this embodiment, the light-blocking coating 15 is subdivided into a plurality of portions. It is in particular contemplated that the light-blocking coating 15 comprises, as illustrated, a plurality of longitudinal portions 150 that are spaced apart from each other along the longitudinal extension of light guide 3 and separated from one another. As shown, the distances between the longitudinal portions 150 may vary, in order to allow to control the output of light and to adapt the visual appearance. Like the coating 15, these portions 150 may also be formed with a pattern, for example a grid pattern.

Figure 8:
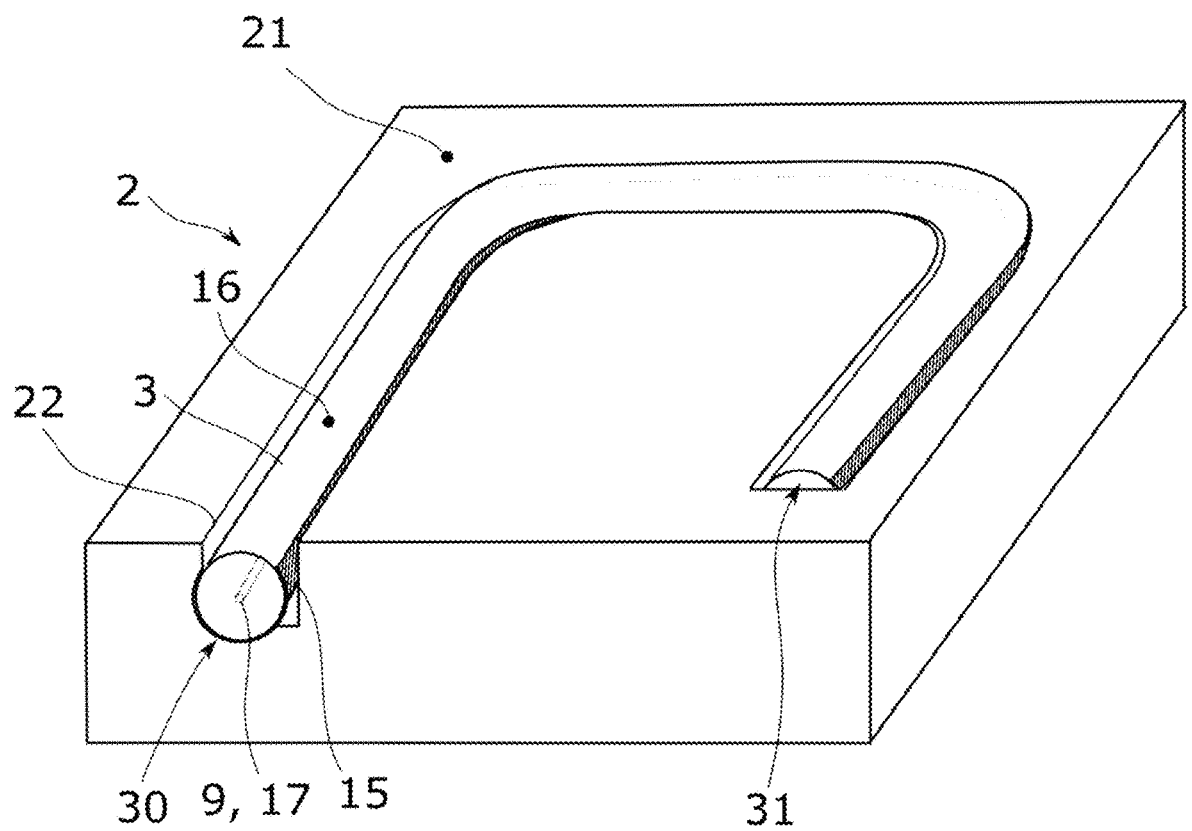
FIG. 8 shows a device with a light source integrated in the surface thereof.

FIG. 8 shows an article or device 2 comprising a light source 1 according to the invention.

Generally, without being limited to the view of FIG. 8, the device has a surface 21 along which the light guide 3 of linear light source 1 extends, and the light-transmissive portion 16 of the lateral surface 13 of light guide 3 is arranged or oriented with respect to the surface 21 in a manner so that the light emerging from the light-transmissive portion 16 is radiated away from the surface 21 of the device 2. Generally, the light-blocking coating 15 is oriented so as to face the device 2 for this purpose.

In order to protect the light guide 3 from damage and also to be able to fix it reliably, it is furthermore contemplated according to one embodiment of the invention that the surface 21 of the device has a recess 22 within which the light guide 3 extends. Recess 22 may have a closed profile, as illustrated. However, it is likewise possible that the surface 21 is defined by a plate which is perforated by the recess and in which case the light guide 3 is installed in the recess 22 on an inner side of the recess 22 or is disposed behind it. Anyhow, the light-blocking coating 15 hides features in or behind the recess, such as dirt that has gotten into it, or technical elements of the device.

If the light-blocking coating is embodied as a metallic specularly reflecting layer, the light guide 3 installed in the surface 21 may have an appearance similar to a metal strip such as a chrome trim, for example, in its switched-off state. With an additional colored layer it is moreover possible to adapt the appearance of the strip, for example by a yellow ink layer that makes the strip appear golden, or a red ink layer that gives the light guide the appearance of a copper strip.

However, the light-blocking coating may also be embodied as a pigmented ink or lacquer layer. In this case, the light guide may be color matched to the color of the surface 21. For example, a black or red lacquer layer could be used as a light-blocking coating 15 in a black or red colored surface 21. Such a light-blocking coating may generally also contain effect pigments. Such pigments may impart a metallic or pearlescent effect. Phosphors may likewise be provided as pigments. Effect pigments may also be embedded in the aforementioned ink layer that is provided in addition to a metal layer.

Generally, with the invention, the light guide 3 can be designed so as to be visually unobtrusive in its off state and so as to fit into the aesthetic design of the device. Conversely, it can also be deliberately highlighted visually, although the light guide is preferably not recognizable as a light guide in its off state. Thus, more generally, the light guide may serve as a design element in its off state, and as an indicator, contour lighting, or orientation aid when the light source is switched on.

Figure 9:
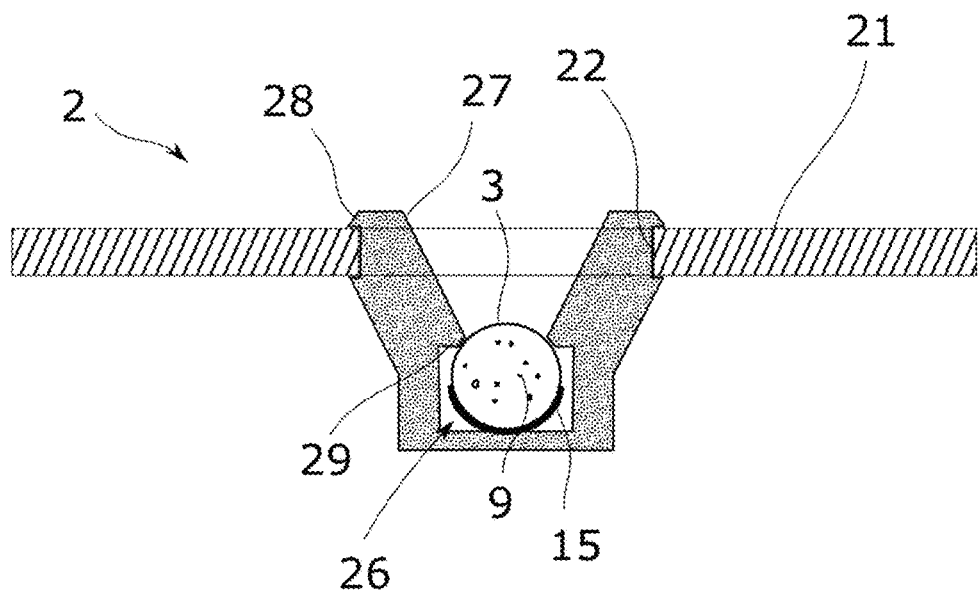
FIG. 9 illustrates a light guide of the light source, which is fixed in a recess by means of a mounting element.

In order to provide for simple installation of the light guide 3 of the light source, it is contemplated according to one embodiment and unlike in the simplifying view of FIG. 8, that the light guide 3 is fixed in the recess 22 using a mounting profile 27. One embodiment thereof is shown in FIG. 9. The mounting profile 27 may be equipped with latching features 28, 29, by means of which the profile 27 is anchored in the recess 22 on the one hand, and the light guide 3 in the mounting profile 27 on the other hand. For example, a plastic profile is suitable as a mounting profile 27. As the light guide 3 is latched only at distinct points, respective interspaces 26 will generally result between the light guide 3 and the mounting profile 27. In these interspaces 26, dirt can accumulate. The light-blocking coating 15 prevents this dirt from being visible through the light guide 3.

Preferred applications of the light source and corresponding devices include contour lighting of motor vehicles, both outside and in the interior. Here, the light sources can highlight the contours of armatures, dashboards, seats, body pillars, as well as of headlamps, rear lights, radiator grills, and of body parts in general. In aircraft, the light sources can generally serve as seat lighting and for marking escape routes. There are also attractive applications for household and kitchen appliances. Here, such light sources can serve, inter alia, to indicate the operating state, i.e., for example, whether the appliances is in operation. Furthermore, furniture, furniture parts or apartment interiors, as well as the interior or exterior of buildings can be equipped with the light sources as lighting or orientation light.

Another use of the light guide according to the invention is the position lighting of aircraft, vessels, and/or trains. Also, runways for aircraft, such as planes, helicopters, airships, etc., can be illuminated with the light source. If the light source of the invention is arranged along the runways and/or in the middle thereof, a linear luminous pattern is produced, which marks the position of the runway in the dark and/or in low visibility conditions. The illumination source can inject the light into the light guides at a few central points which even need not be located in the immediate vicinity of the runway if the glass element is coupled to further light guides. Similarly, it is possible to illuminate piers for watercraft and their moorings, e.g. ferry terminals.

Another possible application of the light source is the illumination and/or backlighting of displays. Displays may include display devices of all kinds, but preferably flat-panel screens, for example computer monitors, tablet computers, flat screen television sets, and the displays of mobile telephones.

Furthermore, it is also intended for contour lighting of medical facilities and equipment. For example, the linear light source may be designed to mark areas or states in the medical field by signal colors. To give an application example, a contour lighting on a window or on a door or on a device itself, for example, may signal whether an X-ray source, a diagnostic device, or treatment device is in operation and/or in which operating state it is. When the X-ray source is in operation, the light source 1 may emit red light, green light may be emitted when the X-ray radiation is switched off, or it may remain switched off.

Another application is the marking of sterile and non-sterile areas. The light source can be used to mark such areas in the form of luminous borders. Such a marking is easily visible and easy to capture, without having to illuminate the environment strongly. This can be advantageous in darkened operating theaters, for example.

LIST OF REFERENCE NUMERALS

1 Linear light source
2 Device
3 Light guide
5 Core
6 Cladding
7 Longitudinal extension of light guide 3
8 Transparent material
9 Scattering element
11 Light-emitting element
13 Lateral surface of 3
15 Light-blocking coating
16 Light-transmissive portion of 13
17 Linear light-scattering region
18 Portion of 13 opposite to 16
19 Plane through 17 and 33
20 Control circuit
21 Surface of 2
22 Recess in 21
25 Light ray 26 Interspace
27 Mounting profile
28, 29 Latching feature
30, 31 Ends of light guide 3
33 Center of 3
150 Longitudinal portion of 15
151, 152 Layers of 15

What is claimed is:

1. A linear light source, comprising:
a light guide including a cladding and a transparent core, the transparent core having a first end, a second end, and a lateral surface along a longitudinal extension, wherein the cladding is free of scattering elements; and
a light-emitting element configured to inject light into the first or second end, the transparent core having a scattering element that changes a propagation direction of the light in the transparent core,
the light guide having a light-blocking coating on at least part of the lateral surface of the core and having a light-transmissive portion along the longitudinal extension so that the light scattered on the scattering element and striking the light-transmissive portion escapes from the light guide, the light-blocking coating having a light transmittance that is lower than a light transmittance of the light-transmissive portion,
wherein the scattering element comprises a fiber-like light-scattering region extending linearly along the longitudinal extension.

2. The linear light source of claim 1, wherein the cladding comprises a transparent cladding surrounding the transparent core.

3. The linear light source of claim 1, wherein the light-blocking coating at least partially reflects or backscatter rays of the light incident on the lateral surface.

4. The linear light source of claim 3, wherein the light-blocking coating comprises a metal coating.

5. The linear light source of claim 4, wherein the metal coating has a thickness of at least 10 nanometers.

6. The linear light source of claim 3, wherein the light-blocking coating comprises an ink layer.

7. The linear light source of claim 1, wherein the light-blocking coating comprises an ink layer.

8. The linear light source of claim 7, wherein the ink layer is a lacquer layer comprising pigment.

9. The linear light source of claim 8, wherein the pigment comprises a fluorescent pigment.

10. The linear light source of claim 8, wherein the pigment comprises a phosphorescent pigment.

11. The linear light source of claim 1, wherein the light-blocking coating extends over the light-transmissive portion.

12. The linear light source of claim 11, wherein the light-blocking coating is a structured coating in the light-transmissive portion such that the structured coating is partially transmissive to the light.

13. The linear light source of claim 12, wherein the structured coating has a layer thickness of sufficient so that part of the light passes therethrough.

14. The linear light source of claim 1, wherein the light-blocking coating comprises a plurality of longitudinal portions spaced along the longitudinal extension of the light guide and separated from each other.

15. The linear light source of claim 1, wherein the linear light-scattering region is offset from a center of the core.

16. The linear light source of claim 15, wherein the linear light-scattering region is offset towards a portion of the lateral surface opposite the light-transmissive portion.

17. The linear light source of claim 15, wherein the linear light-scattering region is arranged such that the light emitted by the light guide is collimated by refraction on the lateral surface.

18. The linear light source of claim 15, wherein the linear light-scattering region is arranged such that the light emitted by the light guide is collimated by reflection on the light-blocking coating.

19. A device comprising:
the linear light source of claim 1; and
a surface along which the light guide extends, wherein the light-transmissive portion is arranged with respect to the surface such that the light emitting from the light-transmissive portion is radiated away from the surface.

20. The device of claim 19, wherein the surface has a recess within which the light guide extends, the light guide being fixed in the recess by a mounting profile.

21. A linear light source, comprising:
a light guide including a transparent core having a first end, a second end, and a lateral surface along a longitudinal extension; and
a light-emitting element configured to inject light into the first or second end, the transparent core having a glass rod scattering element that changes a propagation direction of the light in the transparent core, wherein the light guide is produced by forming a preform of two or more glass rods, wherein at least one of the glass rods contain light-scattering particles so as to define the glass rod scattering element,
the light guide having a light-blocking coating on at least part of the lateral surface of the core and having a light-transmissive portion along the longitudinal extension so that the light scattered on the scattering element and striking the light-transmissive portion escapes from the light guide, the light-blocking coating having a light transmittance that is lower than a light transmittance of the light-transmissive portion.

22. The linear light source of claim 21, wherein the particles are defined by demixing or phase separation in the glass and/or may be formed from the glass.

23. A linear light source, comprising:
a light guide including a transparent core having a first end, a second end, and a lateral surface along a longitudinal extension;
a light-emitting element configured to inject light into the first or second end, the transparent core has a scattering element that changes a propagation direction of the light in the transparent core; and
a light-blocking coating on the lateral surface of the transparent core,
wherein the light guide is produced by forming a preform of two or more glass rods at least one of which comprises light-scattering particles, the light-scattering particles are defined by demixing or phase separation in the glass and/or are formed from the glass, and from drawing the preform such that light guide has a fiber-like light-scattering region that extends linearly along the longitudinal extension, and
wherein the light-blocking coating having a light-transmissive portion along the longitudinal extension so that the light scattered on the scattering element and striking the light-transmissive portion escapes from the light guide, the light-blocking coating having a light transmittance that is lower than a light transmittance of the light-transmissive portion.

24. The linear light source of claim 23, wherein the light guide comprises a transparent cladding surrounding the transparent core.

25. The linear light source of claim 23, wherein the light-blocking coating at least partially reflects or backscatter rays of the light incident on the lateral surface.

26. The linear light source of claim 25, wherein the light-blocking coating comprises a metal coating.

27. The linear light source of claim 26, wherein the metal coating has a thickness of at least 10 nanometers.

28. The linear light source of claim 25, wherein the light-blocking coating comprises an ink layer.

29. The linear light source of claim 23, wherein the light-blocking coating comprises an ink layer.

30. The linear light source of claim 29, wherein the ink layer is a lacquer layer comprising pigment.

31. The linear light source of claim 30, wherein the pigment comprises a fluorescent pigment.

32. The linear light source of claim 30, wherein the pigment comprises a phosphorescent pigment.

33. The linear light source of claim 23, wherein the light-blocking coating extends over the light-transmissive portion.

34. The linear light source of claim 33, wherein the light-blocking coating is a structured coating in the light-transmissive portion such that the structured coating is partially transmissive to the light.

35. The linear light source of claim 34, wherein the structured coating has a layer thickness of sufficient so that part of the light passes therethrough.

36. The linear light source of claim 33, wherein the light-blocking coating comprises a plurality of longitudinal portions spaced along the longitudinal extension of the light guide and separated from each other.

37. The linear light source of claim 23, wherein the linear light-scattering region is offset from a center of the core.

38. The linear light source of claim 37, wherein the linear light-scattering region is offset towards a portion of the lateral surface opposite the light-transmissive portion.

39. The linear light source of claim 37, wherein the linear light-scattering region is arranged such that the light emitted by the light guide is collimated by refraction on the lateral surface.

40. The linear light source of claim 37, wherein the linear light-scattering region is arranged such that the light emitted by the light guide is collimated by reflection on the light-blocking coating.

* * * * *